United States Patent [19]
Schmidt

[11] Patent Number: 5,678,500
[45] Date of Patent: Oct. 21, 1997

[54] SEED DELIVERY DEVICE FOR SEED PLANTER

[75] Inventor: LaVern D. Schmidt, Montezuma, Kans.

[73] Assignee: Montezuma Welding & Mfg., Inc., Montezuma, Kans.

[21] Appl. No.: 522,617

[22] Filed: Sep. 1, 1995

[51] Int. Cl.⁶ .................................................. A01C 5/00
[52] U.S. Cl. ........................... 111/164; 172/560; 172/575
[58] Field of Search ............................ 111/164, 165, 111/166, 167, 168, 169, 170; 37/460; 172/558, 560, 561, 563, 574, 575, 179, 180, 181

[56] References Cited

U.S. PATENT DOCUMENTS

| | | |
|---|---|---|
| 588,027 | 8/1897 | Stephenson ............... 111/164 X |
| 634,239 | 10/1899 | Harding ..................... 111/164 |
| 730,797 | 6/1903 | Rentsch ..................... 111/164 X |
| 744,711 | 11/1903 | Bills ........................... 111/164 X |
| 783,395 | 2/1905 | Ashurst ...................... 111/164 |
| 1,036,436 | 8/1912 | Brennan, Jr. ............... 111/164 |
| 1,184,508 | 5/1916 | Beeman et al. ............ 111/164 |
| 1,204,239 | 11/1916 | Bozard ....................... 111/164 |
| 1,877,005 | 9/1932 | Merklin . |
| 1,924,626 | 8/1933 | Roddel . |
| 2,045,762 | 6/1936 | Elliott . |
| 2,082,141 | 6/1937 | Beran . |
| 2,155,739 | 4/1939 | Seaholm . |
| 2,341,795 | 2/1944 | Kriegbaum et al. ........ 111/164 X |
| 2,454,002 | 11/1948 | Paluck . |
| 2,540,262 | 2/1951 | Higginson ................... 111/164 X |
| 2,571,285 | 10/1951 | Oehler . |
| 2,619,361 | 11/1952 | Connors et al. ............ 111/164 X |
| 2,688,831 | 9/1954 | Rude . |
| 2,901,049 | 8/1959 | De Haai . |
| 2,917,012 | 12/1959 | Oehler et al. . |
| 3,219,000 | 11/1965 | Leach et al. . |
| 3,512,489 | 5/1970 | Coldren et al. ............. 111/164 X |
| 3,888,637 | 6/1975 | Taguchi et al. ............. 37/460 X |
| 4,009,668 | 3/1977 | Brass et al. ................. 111/164 X |
| 4,422,392 | 12/1983 | Dreyer et al. ............... 111/167 X |
| 4,430,952 | 2/1984 | Murray . |
| 4,628,840 | 12/1986 | Jacobson .................... 111/167 X |
| 5,297,497 | 3/1994 | Schmidt . |
| 5,431,233 | 7/1995 | Schmidt . |

OTHER PUBLICATIONS

John Deere "MaxEmerge 2 Planters Brochure," dated Mar. 1994.

*Primary Examiner*—Terry Lee Melius
*Assistant Examiner*—Victor Batson
*Attorney, Agent, or Firm*—Shook, Hardy & Bacon L.L.P.

[57] ABSTRACT

A seed delivery device is positioned on the seed tube of a planter and between a pair of V-oriented opening disks. The device has an elongated duct having an upper end with an opening capable of being disposed in spatial communication with the seed tube. A lower end of the duct has an opening which is positioned directly behind and adjacent to the location where the pair of opening disks contact one another. The duct extends along a substantially straight line below the seed tube so that a seed traveling through the duct is directed in a substantially downward direction into a V-shaped trench. Structure is also provided for attaching the duct to the planter.

15 Claims, 3 Drawing Sheets

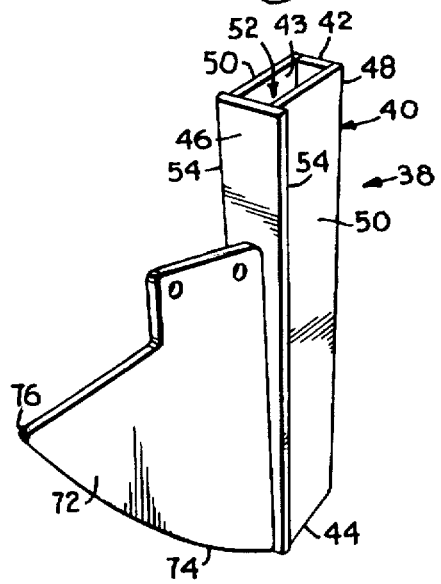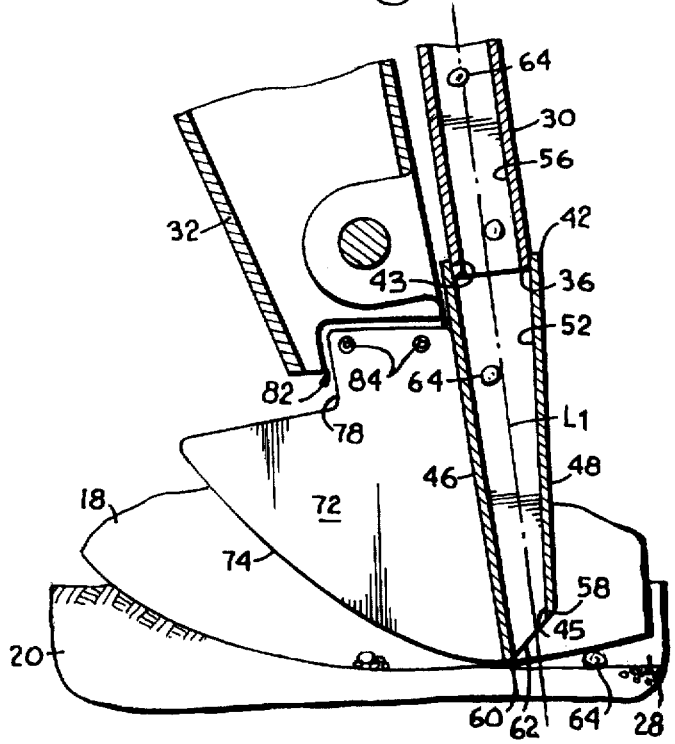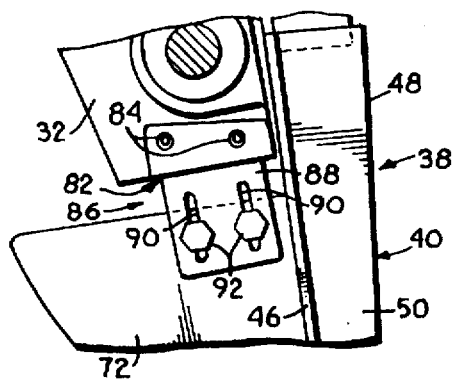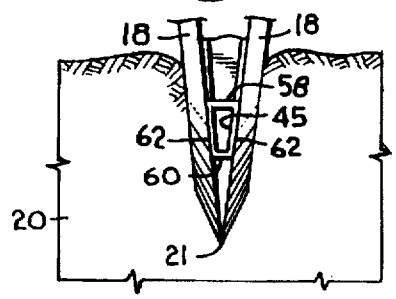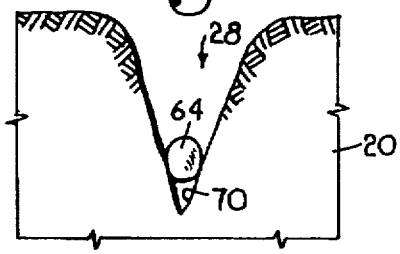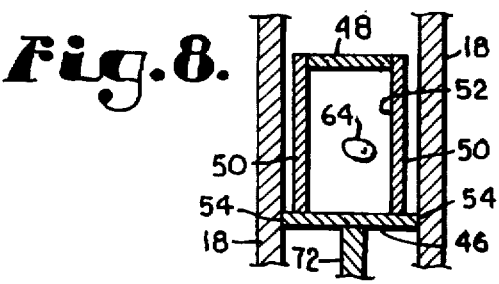

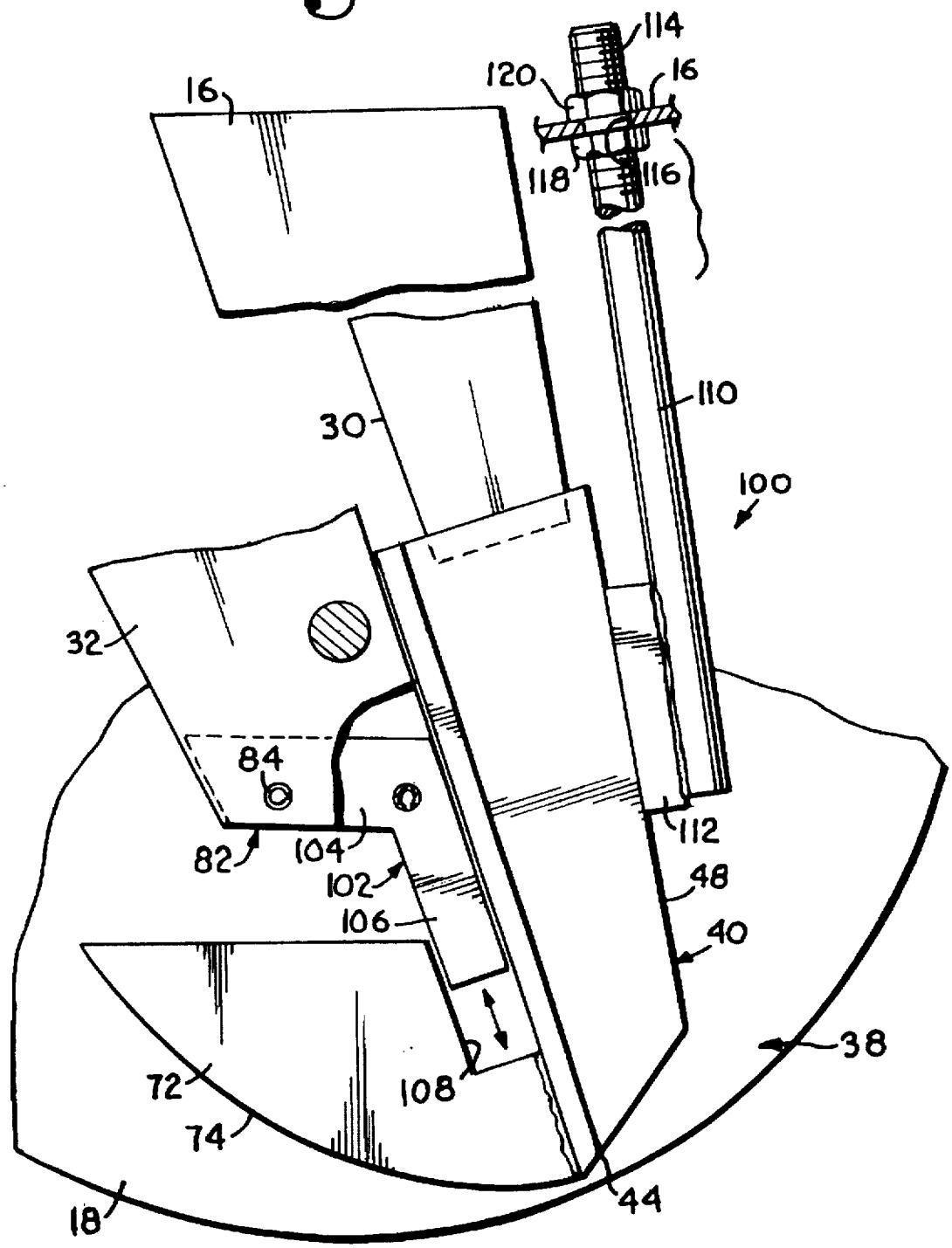

SEED DELIVERY DEVICE FOR SEED PLANTER

The present invention relates in general to seed planters, and, more particularly, to a device for delivering the seed to be planted into a trench formed by the planter.

The planting of seed row crops, such as corn, soybeans, peanuts, cotton, and the like has become an exacting procedure which requires specialized equipment to open the soil, position the seed in the open trench, and then cover the seed with soil. One type of seed planter available utilizes pairs of opening disks which are oriented in a V-shaped orientation to cut V-shaped trenches into the ground to a preselected depth. Two of the most popular planters of this type are the MaxEmerge® and MaxEmerge® 2 planters manufactured by John Deere. These types of planters typically have a seed tube to deliver a seed from a hopper to a trench. A metering device disposed adjacent the hopper introduces seeds into the seed tube at preselected intervals to provide the proper plant spacing. Typically, a seed tube extends downwardly from the hopper and between the opening disks used to cut the V-shaped trench. The seed tube has a lower end with an opening therein for discharging a seed into the trench. The tube typically is curved rearwardly so that the opening in the lower end of the tube imparts a rearward velocity on the seeds and directs the seeds in a rearward direction. The theory behind directing and propelling a seed rearwardly is that the rearward velocity overcomes the forward travel speed of the planter, thus giving a near "dead drop" of the seed into the V-shaped trench.

Although the curved tube and rearward velocity imparted on the seed is supposed to provide equal spacing between the seeds and consistent depth of the seeds, it has been found that this oftentimes does not occur. More specifically, the rearward velocity can result in the seed rolling along the V-shaped trench and possibly being "caught" by the soil in the trench prior to reaching its desired drop location. Further, as is apparent, the theoretical "dead drop" resulting from the rearward velocity of the seed can vary greatly, depending upon the ground speed of the planter and soil conditions. Still further, because the seed is dropped from a seed tube opening that is typically located a relatively substantial distance above the very bottom of the V-shaped trench and because of the seed's rearward velocity, the seed often comes to rest at a location that is not along the very bottom of the V-shaped trench. Therefore, the seeds can have inconsistent depths, and hence inconsistent crop maturation.

An additional factor that can result in seeds being planted at inconsistent depths is the fact that sometimes, due to soil conditions or equipment conditions, a true V-shaped trench is not formed. Instead, a small ridge may be formed at the very bottom of the V-shaped trench. In other words, the trench can have what could be described as an exaggerated W-shape. Because of this ridge formed at the very bottom of the V-shaped trench, the seeds will often fall to either side of the ridge or on top of the ridge, and thus may be planted at inconsistent depths. This random depth placement is exacerbated by the rearward velocity imparted on the seeds and the distance which the seed must travel from the seed tube opening to the bottom of the trench.

A further problem resulting from positioning a seed tube between the opening disks is clogging. More specifically, soil, especially moist soil, is sometimes propelled or forced between the opening disks and catches on the seed tube itself or is caked to the inner surfaces of the opening disks. Furthermore, debris found on the ground surface, for instance crop residue and stubble, also is sometimes forced between the opening disks, thus compounding the clogging problems between the disks. The clogging problems can be especially severe when planters are used in ridge-till, minimum-till, and no-till applications.

Therefore, a device for attachment to a seed tube is needed which will help eliminate the problems with the prior art planters discussed above.

Accordingly, it is a primary object of the present invention to provide a planter seed delivery device that directs a seed in a substantially downwardly direction into a V-shaped trench formed by the planter so that the seed is firmly wedged in the bottom of the V-shaped trench.

A further important object of the present invention is to provide a planter seed delivery device that in addition to delivering a seed to a V-shaped trench also operates to scrape soil from the inner surfaces of the opening disks used to make the V-shaped trench.

Another object of the present invention is to provide a planter seed delivery device that includes a forwardly extending curved blade that further helps prevent clogging between the opening disks by forcing debris below the lower open end of the delivery device.

In the accompanying drawings which form a part of the specification and are to be read in conjunction therewith and in which like reference numerals are used to indicate like parts in the various views:

FIG. 4 is an enlarged, fragmentary detailed cross-sectional view taken generally along line 4—4 of FIG. 2, and showing seeds dropping through the seed tube delivery device of the present invention;

FIG. 5 is a top perspective view of the seed tube delivery device of the present invention;

FIG. 6 is a side elevational view showing an alternative attaching arrangement for securing the seed tube delivery device of the present invention to the frame of the planter;

FIG. 7 is an enlarged, fragmentary rear elevational view of the area by the numeral 7 in FIG. 2;

FIG. 8 is an enlarged, fragmentary detailed cross-sectional view taken generally along line 8—8 of FIG. 3;

FIG. 9 is a cross-sectional view of the V-shaped trench after a seed has been positioned in the valley of the V-shaped trench and prior to the closing of the trench by the pack wheels; and FIG. 10 is a side elevational view of a further alternative adjustable attaching arrangement for securing the seed tube delivery device of the present invention to the frame of the planter, parts being broken away to reveal the details of construction.

Figure 1:
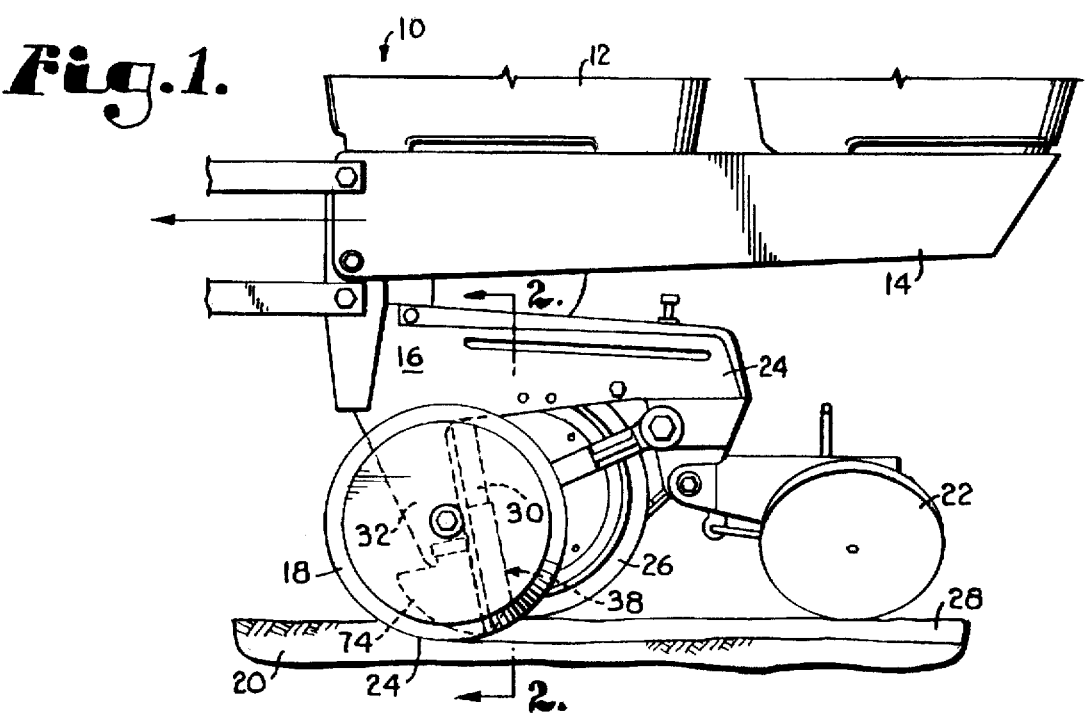
FIG. 1 is a fragmentary, side elevational view of a seed planter showing the structures used to open a trench, plant a seed, and close the trench for a single plant row.

Referring to the drawings in greater detail, and initially to FIG. 1, a seed planter designated generally by the numeral 10 is shown. Planter 10 is attached to and pulled behind a tractor (not shown) and moves generally in the direction shown by the arrow in FIG. 1. Planter 10 has a plurality of seed hoppers 12 supported on a plurality of upper frame extensions 14. Extensions 14 with hoppers 12 disposed thereon are positioned in a lateral row behind the tractor. Each hopper provides seeds to plant one crop row as will be further described.

Figure 2:
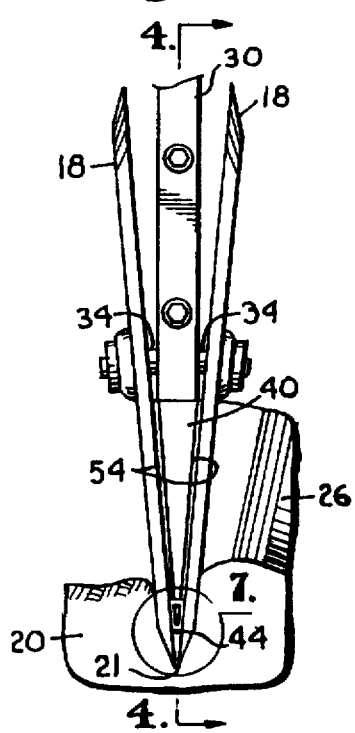
FIG. 2 is an enlarged, fragmentary detailed cross-sectional view taken generally along line 2—2 of FIG. 1, parts being broken away to reveal details of construction and showing the cutting of a y-shaped trench into the soil.

Associated with each combined hopper 12 and extension 14 is a lower frame member 16. Each lower frame member 16 has a pair of soil opening disks 18 mounted side by side and in a V-shaped configuration as best shown in FIG. 2. Disks 18 serve to open a V-shaped trench in soil 20. More specifically, disks 18 contact one another along one portion 21 of their lower peripheries.

Each lower frame member 16 also has a pair of inclined pack wheels 22 mounted on a rearwardly extending section 24 of member 16. Pack wheels 22 close the trench opened by disks 18 following delivery of seeds from hoppers 12 to the trench. The pack wheels are particularly designed to compact the soil immediately overlying the planted seeds and also to leave a mound of loose soil mulch overlaying the compacted soil to facilitate retention of moisture in the soil. Each lower frame member 16 also mounts a depth gauge wheel 26 immediately adjacent and in contact with a portion of one of opening disks 18 to maintain the sharpness of the cutting edge of the disks. Gauge wheel 26 is used to adjust the depth to which a V-shaped trench 28 is cut.

A seed tube 30 extends from each hopper downwardly and between opening disks 18. A metering device (not shown) located adjacent each hopper 12 serves to feed seeds to seed tube 30 at predetermined intervals to provide the spacing of a plant row. Seed tube 30 extends downwardly from its associated hopper through the upper open part of the V-shaped orientation of disks 18 as best shown in FIG. 20. Tube 30 is mounted to a flange section 32 of lower frame member 16. Flange 32 also serves as the mount for disks 18. More specifically, flange 32 has spindles 34 which provide disks 18 with their V-orientation.

Seed tube 30 terminates at a lower open end 36 as best shown in FIG. 4. Typically, an additional tube section is added to or formed integrally with end 36, and this section curves rearwardly so that a seed traveling through seed tube 30 is directed rearwardly with a rearward velocity as explained in detail above.

The heretofore described components and operation of planter 10 are conventional and well-known to those skilled in the art. A seed delivery device embodying the principles of this invention is broadly designated in the drawings by the reference numeral 38. Device 38 has a duct section 40 for conveying a seed from seed tube 30 into the V-shaped trench 28 as best shown in FIGS. 4 and 5. Duct 40 has a generally rectangular cross-section which becomes smaller in size from an upper end 42 to a lower end 44. Upper end 42 has an opening 43 and lower end 44 has an opening 45. The preferred dimensions for opening 45 are approximately a width of ⅜ inch and a length of ¾ inch. This size of opening has been found to be advantageous for positioning seeds correctly within the V-shaped trench. Duct 40 is formed by a flat front plate 46, a flat rear plate 48, and a pair of side plates 50 as best shown in FIGS. 5 and 8. Plates 46, 48 and 50 are preferably formed of a metal material, such as steel, and are connected together at their edges by welding. Plates 46, 48 and 50 when attached together form a generally truncated pyramid-shaped structure with an inner channel 52 also having a generally truncated pyramid shape.

Front plate 46 has a pair of side edges 54 which extend outwardly beyond side plates 50 a small distance as best shown in FIGS. 5 and 8. Each edge 54 contacts the inner surface of one of the disks 18, as best shown in FIGS. 2 and 8. Plate 46 and its edges are tapered downwardly so as to match the V-orientation of disks 18. Each edge 54 serves as a scraper for the inner surface of its adjacent disk 18 so that soil does not collect thereon. More specifically, as planter 10 is moved forwardly, disks 18 will rotate in a direction indicated by the arrow in FIG. 3. If soil tends to build up on the inner surfaces of the disks, it will be dislodged from the surface by the scraping action of each edge 54 on its respective surface.

Upper end 42 of duct 40 fits over the lower end 36 of seed tube 30 so that the seed tube channel 56 is in spatial communication with duct channel 52, as best shown in FIG. 4. As discussed above, seed tube 30 typically has a rearwardly curved section extending from end 36. The curved section can be formed integrally with tube 30 or can be an "add on" section. Before device 38 can be installed, the rearwardly curved section must be removed. In all the figures, the curved section has already been removed. If the curved section is formed integrally with tube 30, it may be necessary to cut tube 30 to form the end 36.

Figure 3:
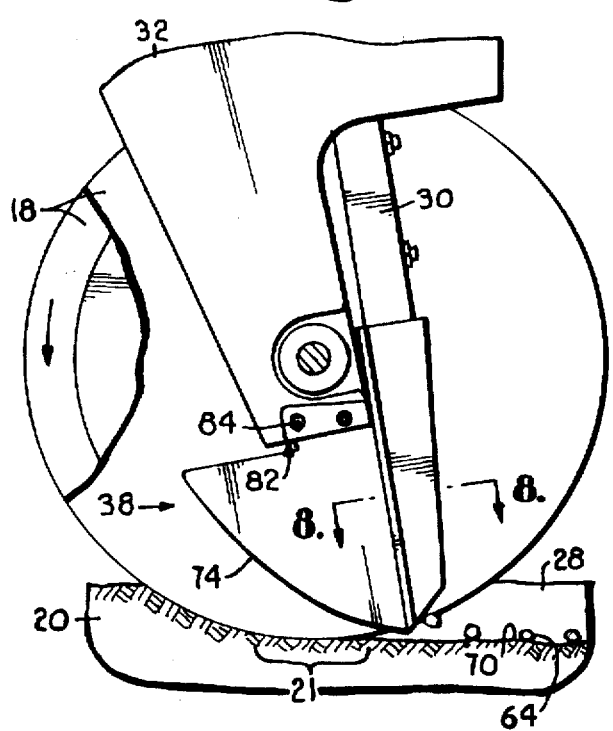
FIG. 3 is an enlarged, fragmentary side elevational view of the trench opening and seed planting structures depicted in FIG. 1, parts being broken away to reveal details of construction and showing the attachment of the seed delivery device of the present invention to the planter frame.

Lower end 44 of duct 40 is formed by the lower edges of plates 46, 48 and 50. The lower edge 58 of rear plate 48 is at a higher vertical location than the lower edge 60 of front plate 46 as best shown in FIG. 4. Lower edges 62 of side plates 50 slant downwardly from edge 58 to edge 60 to form the open end. Edge 60 of front plate 46 is flush with and extends between the peripheral edges of disks 18 at a location that is slightly behind portion 21 where disks 18 contact one another as best shown in FIGS. 3, 4 and 7. The positioning of edge 60 between and at the peripheries of disks 18 prevents soil from accumulating between the periphery of the disks and lower end 44 of duct 40. The positioning of edge 58 above edge 60 further ensures that soil does not clog channel 52 to possibly inhibit exiting of seeds 64 through opening 45.

Generally, the central axis of duct 40 lies along a substantially straight axis $L_1$ as best shown in FIG. 4. Thus, a seed exiting seed tube 30 is directed in a substantially downward direction and exits opening 45 at a location that is slightly behind the portion 21 where disks 18 contact one another as best shown in FIG. 3. Thus, very little, if any, rearward velocity is imparted on the seed 64 as it travels through duct 40. The generally straight and generally downward directed duct 40 minimizes the rearward velocity imparted on a seed and, thus, helps prevents the seed from rolling within trench 28. Further, the substantially downward direction in which a seed is directed by device 38 allows the seed to be more easily wedged in the very bottom or "valley" 70 of trench 28 as shown in FIG. 9. An additional feature for enhancing the "wedging" of the seeds in valley 70 is the positioning of front plate lower edge 60 only a short distance above valley 70 as shown in FIGS. 3 and 4. Thus, seeds 64 do not have a very long distance to drop which will minimize rolling and increase exact placement and wedging of the seeds within valley 70.

Device 38 further has a runner blade 72 extending forwardly therefrom and attached to front plate 46 as best shown in FIGS. 3–5. Blade 72 has an arcuate lower edge 74 which extends from lower edge 60 of front plate 46 to an elevated location 76. Blade 72, and more specifically, arcuate edge 74, forces crop residue, dirt clods and other debris downwardly below lower edge 60 of front blade 46, as the planter 10 is moved forwardly through the ground. More specifically, debris is forced below the end of duct 40 so that it does not obstruct the V-shaped trench or interfere with the placement or wedging of the seeds within the trench. An additional advantage of blade 72 relates to the fact that sometimes a small ridge is formed in valley 70 of trench 28. More specifically, trench 28 can sometimes have an exaggerated W-shape wherein there is a centrally disposed ridge at the bottom of the trench with small valleys on each side of the ridge. Such ridge disposed in the bottom of the trench can result in seeds being planted at inconsistent depths depending on where they fall within the trench. It has been found that edge 74 of blade 72 serves to compact and help eliminate such a ridge so that a truer V-shaped trench is formed with a valley 70 in which the seed can be wedged.

Blade 72 further has connecting portion 78 in which through apertures 80 are formed as best shown in FIG. 5. Connecting portion 78 engages a connecting slot 82 formed on the lower end of flange 32 as best shown in FIGS. 3 and 4. To secure device 38 to flange 32, portion 78 is positioned in slot 82 and apertures 80 are aligned with apertures (not shown) formed in the sidewalls of slot 82. Thereafter, roll pins 84 are positioned within the aligned apertures. The connection of device 38 through the use of roll pins allows the device to have some side-to-side and front-to-back movement or "play." This "play" or movement allows the device to align with the V-orientation of disks 18. This aligning function is important to ensure that edges 54 engage the inner surfaces of the disks to adequately scrape soil therefrom.

With reference to FIG. 6, an alternate arrangement 86 is shown for connecting device 38 to flange 32. More specifically, the arrangement shown in FIG. 6 allows the lower end 44 of seed tube 30 to be adjusted downwardly as it wears to ensure that edge 60 is always flush with the peripheral edges of disks 18. Arrangement 86 has an additional separate connecting plate 88. Plate 88 fits within slot 82 and is secured thereto by roll pins 84. Plate 88 has elongated adjusting slots 90 formed therein. Bolts 92 fit and can slide within slots 90. Bolts 92 also engage apertures (not shown) in blade 72. The vertical height of lower end 44 of duct 40 can be adjusted by loosening bolts 92, sliding the duct and blade 72 attached thereto downwardly, and retightening the bolts to secure those structures at the desired vertical location.

With reference to FIG. 10, a further alternative adjusting arrangement 100 is shown for connecting device 38 to flange 32. Arrangement 100 has an L-shaped attaching plate 102 which has an attaching portion 104 and a guide portion 106. Portion 104 is positioned in slot 82 and secured thereto by roll pins 84. Guide portion 106 is received in a slot 108 formed in runner 72.

Arrangement 100 further includes adjusting rod 110 which is attached on its lower end to rear plate 48 of duct 40 through attaching member 112. Rod 110, attaching member 112, and duct 40 can be connected together by any suitable means, for example welding. The upper end of rod 110 has a thread surface 114 and is disposed through an aperture 116 formed in a horizontal portion 16a of lower frame member 16. A nut 118 is positioned below aperture 116 and a further nut 120 is positioned above aperture 16.

Arrangement 100 allows raising and lowering of device 38 by simply loosening or tightening nuts 118 and 120. More specifically, device 38 is prevented from side-to-side movement by its positioning between disks 18. Furthermore, device 38 is prevented from forward and rearward movement by the positioning of guide portion 106 in slot 108. However, guide portion 106 can slide within slot 108 to allow upward and downward movement as depicted by the arrow in FIG. 10. In order to move device 38 downwardly, nut 120 is rotated by a wrench such that it moves relatively upwardly on thread surface 114. Typically, as this is done, device 38 will move downwardly due to its own weight. If, however, device 38 is slightly jammed, rotating nut 118 such that it moves relatively upwardly on surface 114 will force device 38 downwardly. The device can be secured at its desired location by tightening nuts 118 and 120 to the horizontal portion 16a of frame member 16. To move device 38 upwardly, nut 118 is rotated so that it moves relatively downwardly on thread surface 114. Thereafter, nut 120 is also rotated on the horizontal plate 16a of frame member 16 such that thread surface 114 and thus device 38 moves upwardly. Therefore, the position of the lower end 44 of duct 40 can be adjusted by simply manipulating nuts 118 and 120.

It has been found that lower end 44 of duct 40 and arcuate edge 74 of blade 72 tend to wear due to their passage through the soil. Therefore, edge 72 and lower edges 58, 60 and 62 that form end 44 can be treated to increase their hardness and wearability in any suitable manner, for example, by applying a tungsten powder treatment to these edges.

In operation, planter 10 is moved along the ground so that disks 18 rotate and cut the V-shaped trench 28 in soil 20. Side edges 54 of duct 40 ensure by their engagement with the inner surfaces of the disks that soil does not accumulate and clog the space between the disks. Additionally, blade 72 forces any debris or dirt clods below the lower end 44 of seed tube 30 so that these items will not interfere with the placement of seeds 64. Further, blade 72 ensures that there is a well-formed valley positioned at the bottom of trench 28 so that a seed can be wedged in the valley. More specifically, blade 72 compacts ridges that may have resulted in trench 28 due to, for example, disks 18 not being properly aligned or the planter bouncing or rocking within the soil.

As shown in FIG. 4, the straight alignment of duct 40 ensures that seeds 64 are deposited in a substantially downward direction with a minimal rearward velocity imparted thereon. Thus, the seeds tend to wedge within valley 70 (as shown in FIG. 9) after they exit opening 45 of end 44 and are maintained at their properly spaced intervals, instead of rolling rearwardly. Thus, it has been found that with the use of device 38, seeds are spaced more evenly and placed at a more consistent depth. This planting consistency is further increased by the positioning of lower end 44 slightly behind portion 21 where disks 18 contact one another. Thus, edge 60 is only slightly above the trench valley 70 and the seed does not travel far from the time it exits duct 40 to its final position within the trench. This small "dropping distance" reduces the chance of the seed catching on the sidewalls of the trench which often results in inconsistent spacing or depth.

Having described the invention, I claim:

1. A seed delivery device for attachment to a planter, said device positioned on a seed tube of the planter and between a pair of opening disks positioned in a V-orientation and contacting one another at a location along their peripheries so that they form a V-shaped trench in the soil for planting a seed, the device comprising:

an elongated duct having an upper end with an opening capable of being disposed in spatial communication with the seed tube of the planter when the device is installed on the planter, and a lower end with an opening disposed behind where the pair of opening disks contact one another so that said lower end is capable of depositing a seed in the V-shaped trench formed by the opening disks, said duct extending along a substantially straight line below the seed tube so that a seed traveling through the duct is directed in a substantially downward direction into the formed V-shaped trench and is wedged therein;

a blade attached to a forward portion of said duct, said blade having a lower edge that curves upwardly and forwardly from said lower end of said duct, said lower curved edge forcing debris below said duct and engaging and compressing soil in the valley of the trench formed by the opening disks so that the trench tends to have more of a V-shape; and means for attaching said duct to the planter.

2. The seed delivery device of claim 1 wherein said duct has a generally rectangular cross-section and is formed by a front plate, a rear plate and a pair of side plates.

3. The seed delivery device of claim 2 wherein said front plate has a pair of scraping edges formed on opposite sides thereof, each said scraping edge engaging the inner surface of one of said opening disks to help prevent build up of soil thereon.

4. The seed delivery device of claim 3 wherein said scraping edges converge towards one another as they extend downwardly so that they conform to the inner surfaces of the V-oriented opening disks.

5. The seed delivery device of claim 2 wherein said lower end of said duct has a generally rectangular shape, a front edge of said lower end being vertically lower than a rear edge of said lower end so that said opening of said lower end is slanted in an upwardly and rearwardly direction.

6. The seed delivery device of claim 1 further comprising adjusting means for allowing positioning of said duct in a plurality of generally vertical positions.

7. The delivery device of claim 1, wherein said lower end of said duct is treated to increase its wearability.

8. The delivery device of claim 1 wherein said lower curved edge of said blade is treated to increase its wearability.

9. A seed delivery device for attachment to a planter, said device positioned on a seed tube of the planter and between a pair of opening disks positioned in a V-orientation and contacting one another at a location along their peripheries so that they form a V-shaped trench in the soil for planting a seed, the device comprising:

an elongated duct having an upper end with an opening capable of being disposed in spatial communication with the seed tube of the planter when the device is installed on the planter, and a lower end with an opening disposed behind where the pair of opening disks contact one another so that said lower end is capable of depositing a seed in the V-shaped trench formed by the opening disks, said duct extending along a substantially straight line below the seed tube so that a seed traveling through the duct is directed in a substantially downward direction into the formed V-shaped trench and is wedged therein;

a pair of scraping edges formed on opposite sides of a front plate that is coupled with said duct, each said scraping edge engaging the inner surface of one of said opening disks to help prevent build up of soil thereon, said scraping edges converging towards one another as they extend downwardly so that they conform to the inner surfaces of the V-oriented opening disks;

a blade attached to a forward portion of said duct, said blade having a lower edge that curves upwardly and forwardly from said lower end of said duct, said lower curved edge forcing debris below said duct and engaging and compressing soil in the valley of the trench formed by the opening disks so that the trench tends to have more of a V-shape; and means for attaching said duct to the planter.

10. The seed delivery device of claim 9 further comprising adjusting means for allowing positioning of said duct in a plurality of generally vertical positions.

11. A seed delivery device for attachment to a planter, said device positioned on a seed tube of the planter and between a pair of opening disks positioned in a V-orientation and contacting one another at a location along their peripheries so that they form a V-shaped trench in the soil for planting a seed, the device comprising:

an elongated duct of generally rectangular cross-section that is formed by a front plate, a rear plate and a pair of side plates, said front plate having a pair of scraping edges formed on opposite sides thereof, each said scraping edge engaging the inner surface of one of said opening disks to help prevent build up of soil thereon, said duct having an upper end with an opening capable of being disposed in spatial communication with the seed tube of the planter when the device is installed on the planter, and a lower end with an opening disposed behind where the pair of opening disks contact one another so that said lower end is capable of depositing a seed in the V-shaped trench formed by the opening disks, said duct extending along a substantially straight line below the seed tube so that a seed traveling through the duct is directed in a substantially downward direction into the formed V-shaped trench and is wedged therein; and means for attaching said duct to the planter.

12. The seed delivery device of claim 11 wherein said scraping edges converge towards one another as they extend downwardly so that they conform to the inner surfaces of the V-oriented opening disks.

13. The seed delivery device of claim 12 further comprising adjusting means for allowing positioning of said duct in a plurality of generally vertical positions.

14. The delivery device of claim 13, wherein said lower end of said duct is treated to increase its wearability.

15. The delivery device of claim 14 wherein said lower curved edge of said blade is treated to increase its wearability.

* * * * *